US011268677B2

(12) United States Patent
Mei et al.

(10) Patent No.: US 11,268,677 B2
(45) Date of Patent: Mar. 8, 2022

(54) THREAD TRANSMISSION STRUCTURE, OPTICAL SYSTEM AND SPOTLIGHT USING THE THREAD TRANSMISSION STRUCTURE

(71) Applicants: OPPLE LIGHTING CO., LTD., Shanghai (CN); SUZHOU OPPLE LIGHTING CO., LTD., Suzhou (CN)

(72) Inventors: Jie Mei, Shanghai (CN); Yueping Wang, Shanghai (CN); Dun Chen, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 16/599,400

(22) Filed: Oct. 11, 2019

(65) Prior Publication Data

US 2020/0041102 A1 Feb. 6, 2020

Related U.S. Application Data

(63) Continuation of application No. PCT/CN2018/082386, filed on Apr. 9, 2018.

(30) Foreign Application Priority Data

Apr. 11, 2017 (CN) ........................... 20170233432.0
Apr. 11, 2017 (CN) ........................... 20172037666.2
Apr. 11, 2017 (CN) ......................... 201720376152.0

(51) Int. Cl.
*B60Q 1/14* (2006.01)
*F21V 14/06* (2006.01)
*F21V 5/04* (2006.01)

(52) U.S. Cl.
CPC .............. *F21V 14/06* (2013.01); *F21V 5/045* (2013.01); *F21V 5/048* (2013.01)

(58) Field of Classification Search
CPC .......... F21V 14/06; F21V 14/02; F21V 5/048; F21V 14/065; F21V 17/02; F21V 19/02;
(Continued)

(56) References Cited

U.S. PATENT DOCUMENTS 8,602,803 B2 * 12/2013 Fukano .............. H01R 33/9658 439/271
2007/0133200 A1 * 6/2007 Uke ........................ F21L 4/027 362/202

(Continued)

FOREIGN PATENT DOCUMENTS

CN 205065618 U 3/2016
CN 205079081 U 3/2016

(Continued)

OTHER PUBLICATIONS

IP.com English translation of CN 105782936 A. cited by the applicant in IDS filed Oct. 11, 2019 (Year: 2016).*

(Continued)

*Primary Examiner* — Omar Rojas Cadima
(74) *Attorney, Agent, or Firm* — Arch & Lake LLP

(57) ABSTRACT

The present disclosure discloses a thread transmission structure, and an optical system and a spotlight using the transmission structure. The thread transmission structure includes a sliding element and a rotation adjustment ring sleeved on an outer ring of the sliding element, the rotation adjustment ring being sleeved on an outer side of the sliding element and coupled to the sliding element, the rotation adjustment ring includes an internal thread, the sliding element includes an external thread, the sliding element includes a plurality of thread segments spaced along a circumferential direction, the plurality of thread segments forming at least one round of interrupted external thread, a thread form of the internal thread and the external thread being trapezoidal or rectangular, and the rotation adjustment ring being rotatable rela- (Continued)

tive to the sliding element to push the sliding element to slide in an axial direction.

16 Claims, 10 Drawing Sheets

(58) Field of Classification Search
CPC ....... F21V 17/168; G02B 7/004; G02B 7/026; G02B 7/022
See application file for complete search history.

(56) References Cited

U.S. PATENT DOCUMENTS

| | | | |
|---|---|---|---|
| 2008/0137345 A1 | 6/2008 | Wimberly | |
| 2015/0131175 A1* | 5/2015 | Lamontagne .......... | G02B 7/026 359/830 |

FOREIGN PATENT DOCUMENTS

| | | |
|---|---|---|
| CN | 105757615 A | 7/2016 |
| CN | 105782936 A | 7/2016 |
| CN | 106969330 A | 7/2017 |
| CN | 206803029 U | 12/2017 |
| CN | 206803030 U | 12/2017 |

OTHER PUBLICATIONS

International Search Report (including English translation) and Written Opinion issued in PCT/CN2018/082386, dated Jun. 27, 2018, 13 pages.
Chinese First Office Action issued in CN201710233432.0, dated Aug. 3, 2018, 4 pages.
Chinese Second Office Action issued in CN201710233432.0, dated Apr. 18, 2019, 4 pages.

* cited by examiner

THREAD TRANSMISSION STRUCTURE, OPTICAL SYSTEM AND SPOTLIGHT USING THE THREAD TRANSMISSION STRUCTURE

CROSS-REFERENCE TO RELATED APPLICATIONS

This application is based upon and claims the priority of PCT patent application No. PCT/CN2018/082386 filed on Apr. 9, 2018 which claims the priority of Chinese Patent Application No. 201710233432.0 filed on Apr. 11, 2017, Chinese Patent Application No. 201720376152.0 filed on Apr. 11, 2017, and Chinese Patent Application No. 201720376663.2 filed on Apr. 11, 2017, the entire content of all of which is hereby incorporated by reference herein for all purposes.

TECHNICAL FIELD

The present disclosure belongs to the technical field of illumination, and particularly relates to a thread transmission structure, and an optical system and a spotlight using the transmission structure.

BACKGROUND

A spotlight is a common lighting device, and light is directly irradiated on an item to be emphasized to achieve a focused effect.

SUMMARY

The present disclosure provides a thread transmission structure with high transmission efficiency and a spotlight with a stationary shape.

In one aspect, the present disclosure provides a thread transmission structure. The thread transmission structure may include a sliding element and a rotation adjustment ring sleeved on an outer ring of the sliding element. The rotation adjustment ring may be sleeved on an outer side of the sliding element and may be coupled to the sliding element by thread. The rotation adjustment ring may include an internal thread, the sliding element may include an external thread. The sliding element may include a plurality of thread segments spaced along a circumferential direction, and the plurality of thread segments may form at least one round of interrupted external thread. A thread form of the internal thread and the external thread may be trapezoidal or rectangular, and the rotation adjustment ring is rotatable relative to the sliding element to push the sliding element to slide in an axial direction.

In another aspect, the present disclosure further provides a spotlight. The spotlight may include a lamp body, a sliding element being in the lamp body and slidable along an axial direction of the lamp body, a light emitting assembly fixed at a front end of the sliding element and linked with the sliding element, and a first lens at a front end of the lamp body and a rotation adjustment ring sleeved on an outer ring of the lamp body where the rotation adjustment ring may be coupled to the sliding element by thread, and may be rotatable relative to the sliding element and drives the sliding element to slide in the lamp body in the axial direction, and to adjust a distance between the light emitting assembly and the first lens.

It is to be understood that both the foregoing general description and the following detailed description are exemplary and explanatory only and are not restrictive of the present disclosure.

BRIEF DESCRIPTION OF THE DRAWINGS

In order to clearly illustrate the technical solution of examples of the present disclosure, the drawings of the examples will be briefly described in the following, it is obvious that the drawings in the description are only related to a plurality of examples of the present disclosure and not limited to the present disclosure.

DETAILED DESCRIPTION

Figure 1:
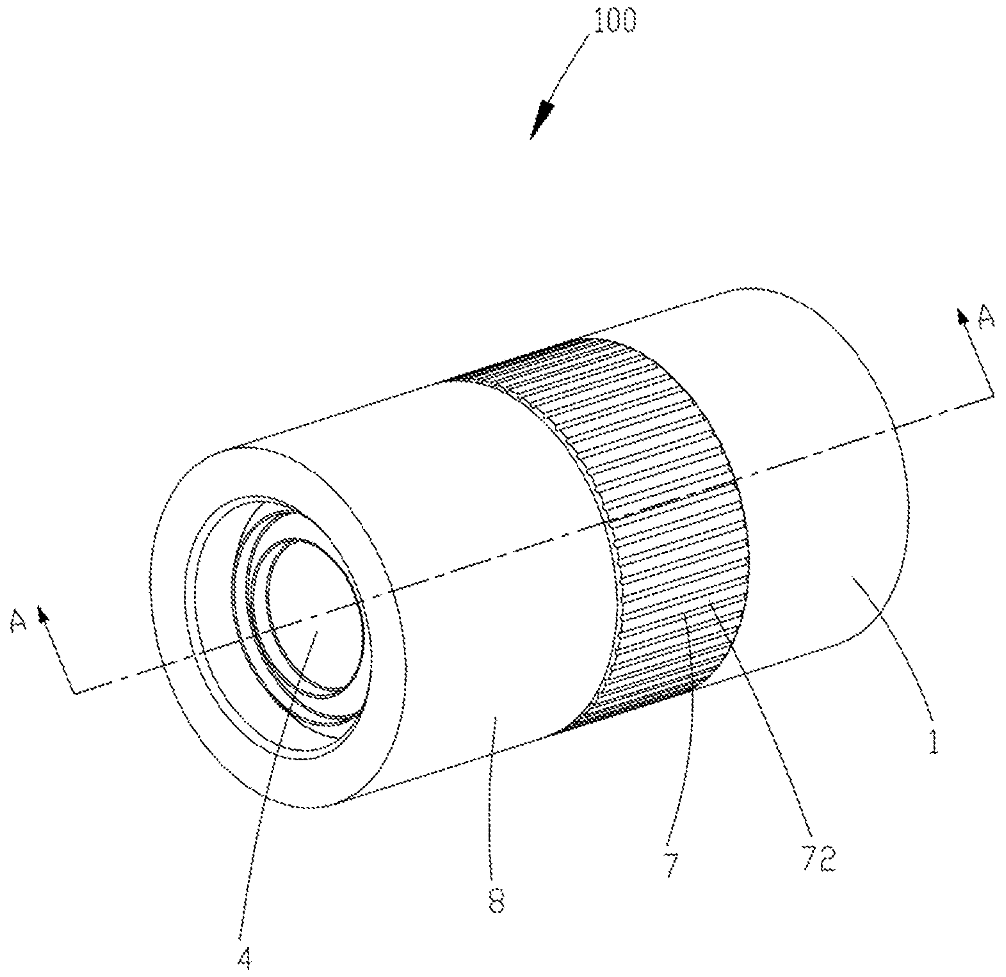
FIG. 1 is a stereogram of a spotlight according to an example of the present disclosure.

In order to make objects, technical details and advantages of the examples of the present disclosure apparent, the technical solutions of the present disclosure will be described in a clearly and fully understandable way in connection with examples and drawings related to the present disclosure. The described examples are just a part but not all examples of the present disclosure. Based on the described examples herein, those skilled in the art can obtain other example(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

A spotlight includes a casing, a light emitting source, and a reflector. The light emitted by the light emitting source is condensed and reflected by the reflector. The fittings of the spotlight with this structure are fixed structures, and the distance between the light emitting source and the reflector is also fixed, and the focal length of the spotlight may not be adjusted.

Sometimes, some spotlights of which the focal length is adjustable appear on the market, and the focal length adjustment structure therein generally includes an inner sleeve and an outer sleeve which are sleeved on the lamp cylinder, the lamp cylinder and the outer sleeve are fixed relative to each other, and the inner sleeve is slidable relative to the outer sleeve. Upon this focal length adjustment structure being used for focus adjustment, it is needed to rotate a few rounds to adjust the beam angle from the maximum angle to the minimum angle. In this way, the transmission efficiency may be low and the operation may not be convenient, also, defects may exist such that the length may not be fixed and the positioning stability may not be high.

A thread transmission structure is a structure that can convert a rotational motion into a linear motion, which may be a structure in the industrial field. Some thread transmission structures are divided into a triangular thread, a rectangular thread, a trapezoidal thread, a zigzag thread and other special shape threads according to its sectional shape (thread form). A trapezoidal thread is generally used for the transmission of heavy items. In small industrial products, a triangular thread is generally used for the connection. There may not be focal length adjustment structure applying a trapezoidal thread to a spotlight.

As illustrated by FIG. 1 to FIG. 11, the present example provides a spotlight 100, including a lamp body 1, a light source module in the lamp body 1 and slidable along an axial direction of the lamp body 1, a first lens 4 fixed to a front end of the lamp body 1, a rotation adjustment ring 7 sleeved on an outer ring of the lamp body 1 and a front cover 8 connected to the lamp body 1. The light source module includes a sliding element 2, a light emitting assembly 3 fixed to the sliding element 2 and a second lens 6 covering the light emitting assembly 3. For example, the rotation adjustment ring 7 is sleeved on the outer side of the sliding element 2 and is rotatable relative to the lamp body 1, thereby pushing the sliding element 2 to slide in the axial direction within the lamp body 1 to adjust the distance between the light emitting assembly 3 and the second lens 6, then to adjust a beam angle of the spotlight 100.

Figure 3:
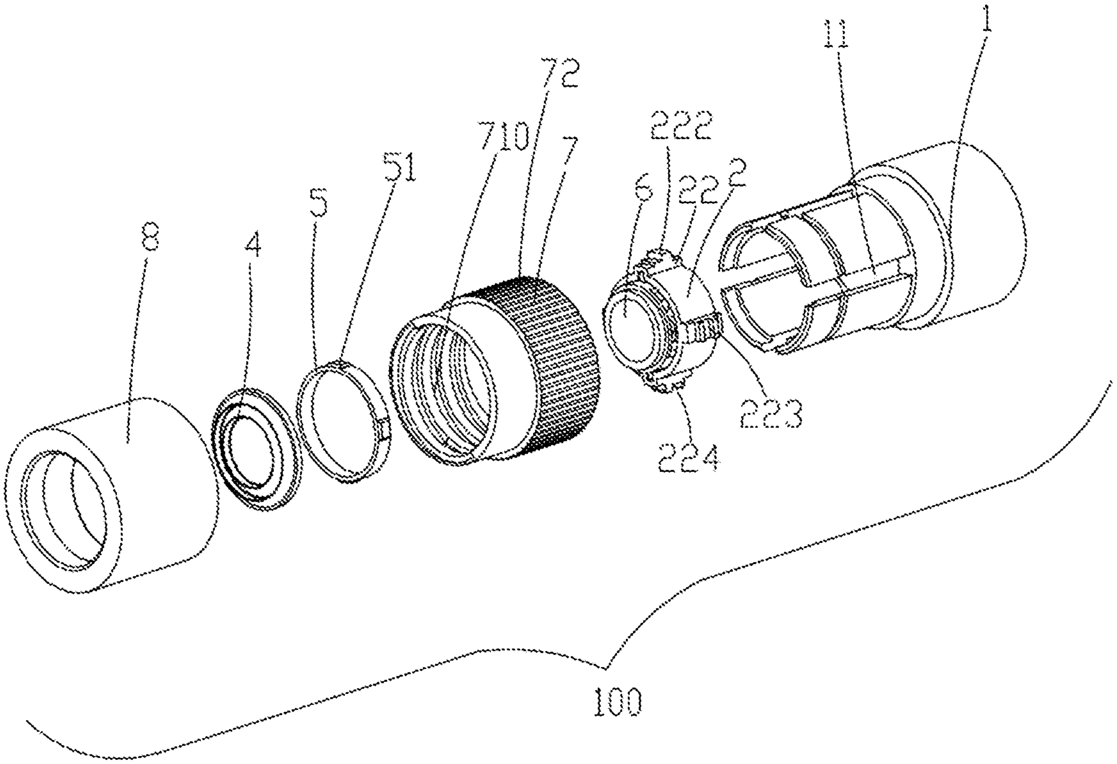
FIG. 3 is a further exploded view of the spotlight of FIG. 2 according to an example of the present disclosure.

As illustrated by FIG. 3, the lamp body 1 is cylindrical and made of a metal material. A plurality of sliding grooves 11 are formed in a longitudinal direction of a side wall of the lamp body 1, and the plurality of sliding grooves 11 are spaced in a circumferential direction of the lamp body 1. The sliding grooves 11 penetrate the side wall of the lamp body 1. In the present example, the number of the sliding grooves 11 is set to four.

Figure 4:
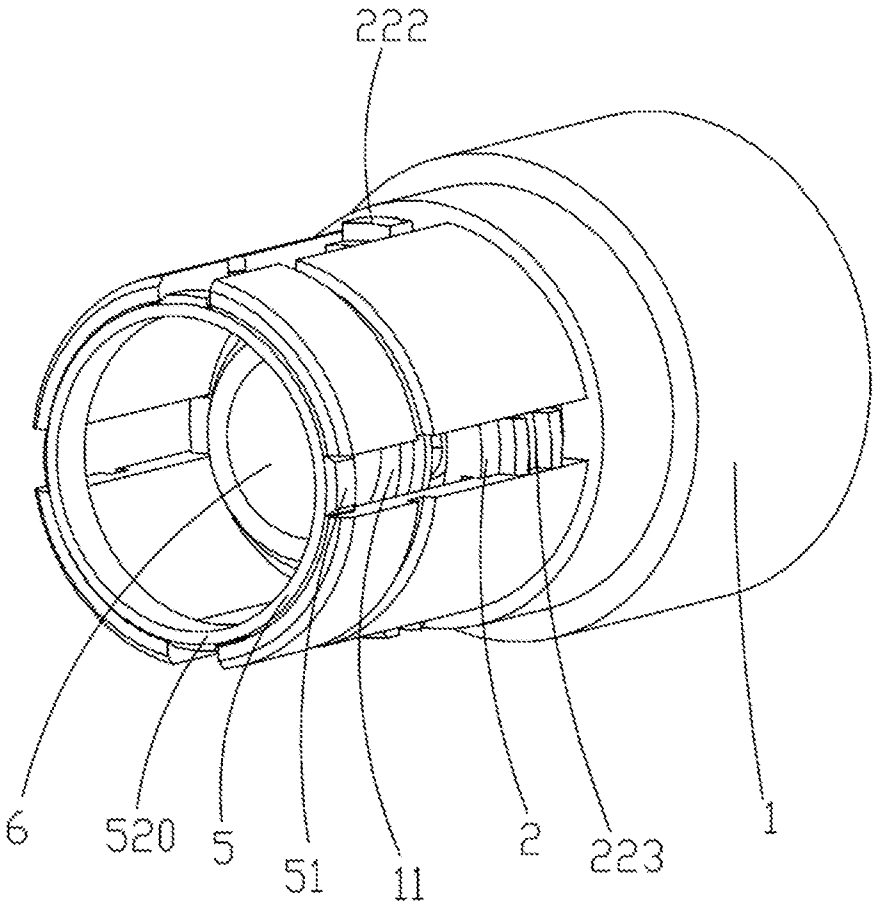
FIG. 4 is a schematic view showing that a sliding element of the spotlight is located in a first position of a lamp body according to an example of the present disclosure.
Figure 5:
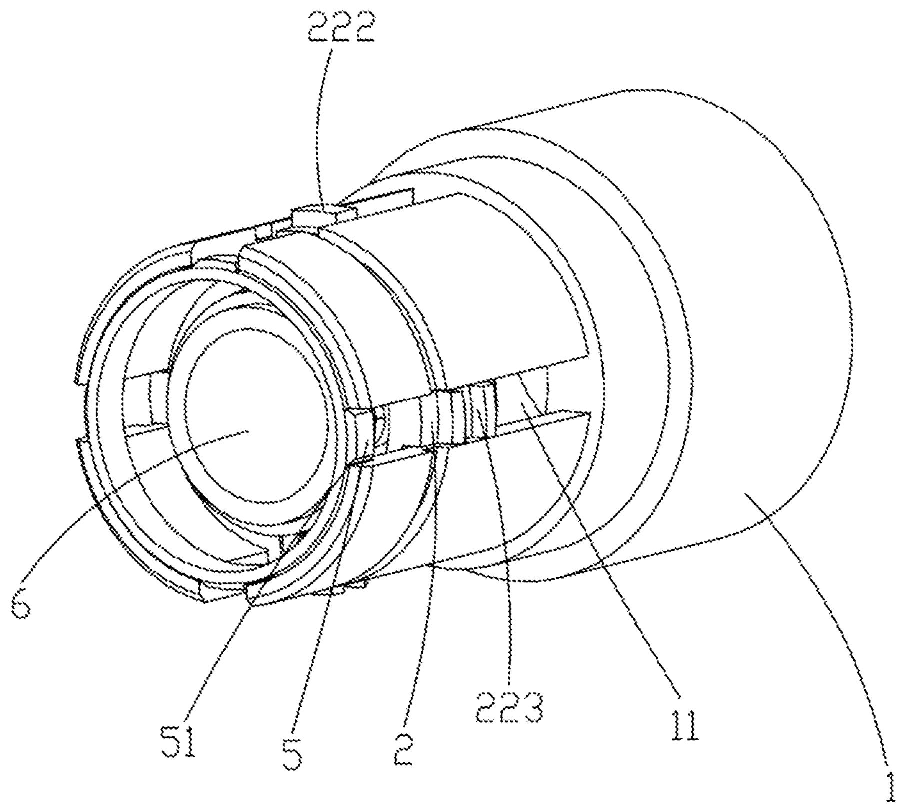
FIG. 5 is a schematic view showing that a sliding element of the spotlight is located in a second position of a lamp body according to an example of the present disclosure.
Figure 11:
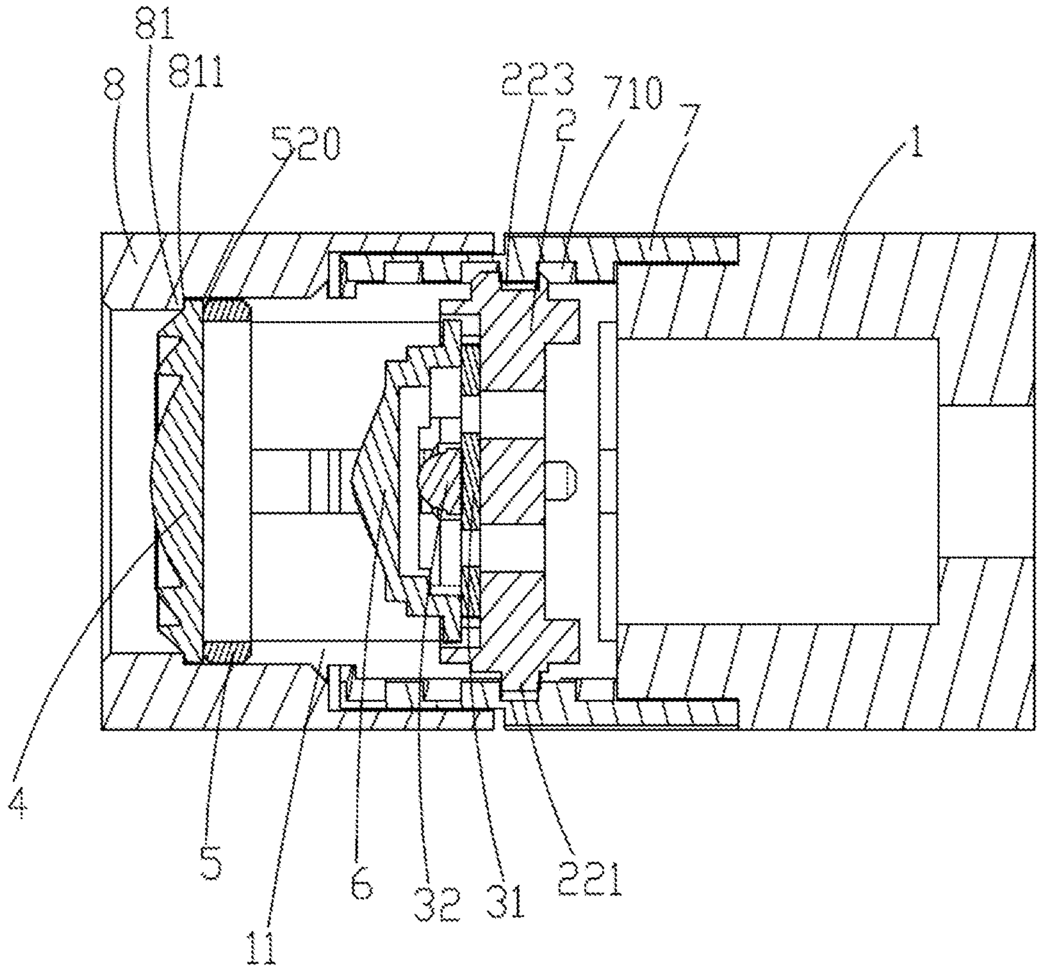
FIG. 11 is a section view along line A-A of FIG. 1.

As illustrated by FIG. 4 and FIG. 11, the spotlight 100 of the present example further includes a supporting member 5, the supporting member 5 is connected to the front end of the lamp body 1. The supporting member 5 is an annular ring and made of a metal material, the supporting member 5 includes a plurality of supporting blocks 51 protruding from the outer surface of the side wall thereof and a front end surface 520. Each of the supporting blocks 51 is snapped into the sliding grooves 11 and at the front end of the sliding grooves 11 respectively, for maintaining the front end of the sliding grooves 11 in an expanded state, thereby causing the sliding element 2 to smoothly slide in the sliding grooves 11.

Figure 6:
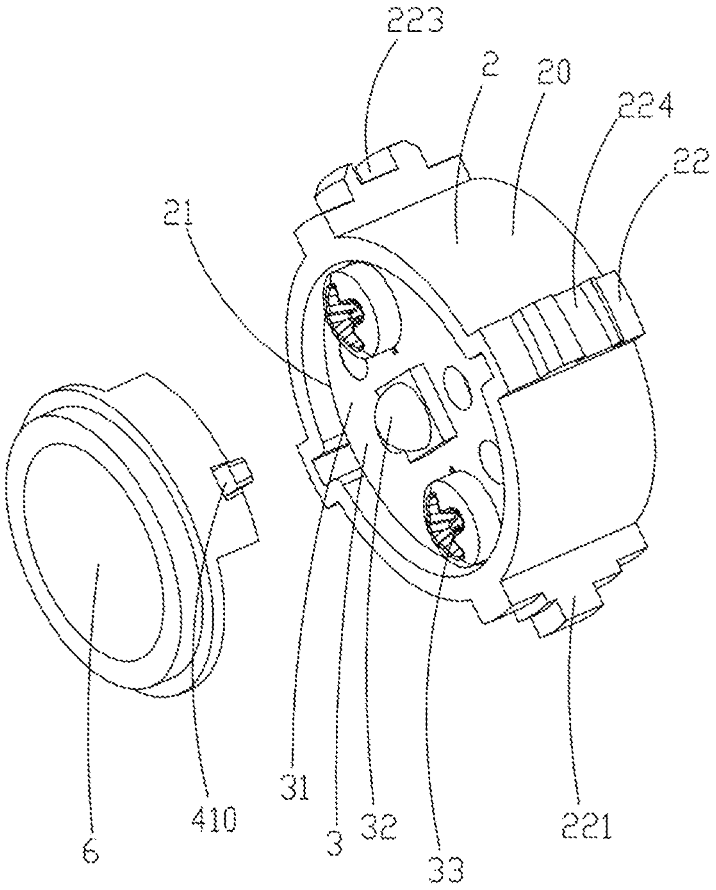
FIG. 6 is a partially exploded view of a light source module of the spotlight according to an example of the present disclosure.
Figure 7:
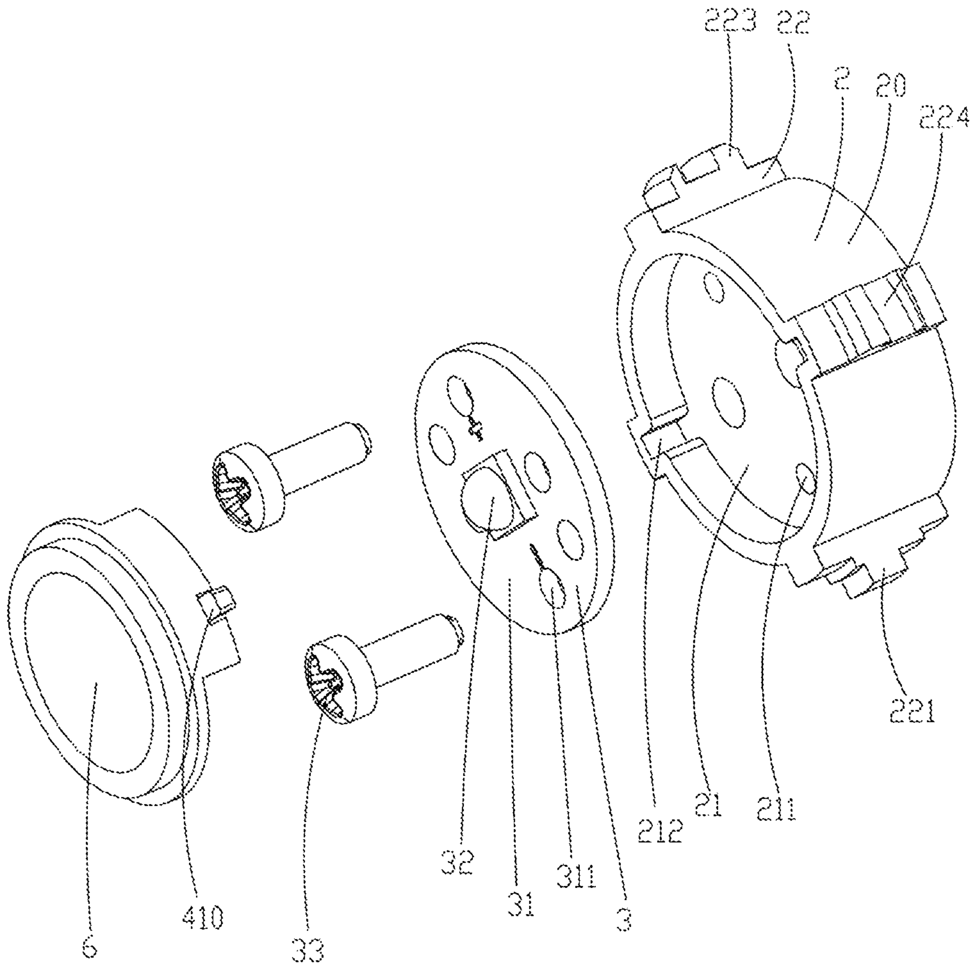
FIG. 7 is a further exploded view of the light source module of FIG. 6.

As illustrated by FIG. 6, FIG. 7 and FIG. 11, the light source module includes the sliding element 2, the light emitting assembly 3 fixed to the sliding element 2 and the second lens 6 covering the light emitting assembly 3.

Figure 8:
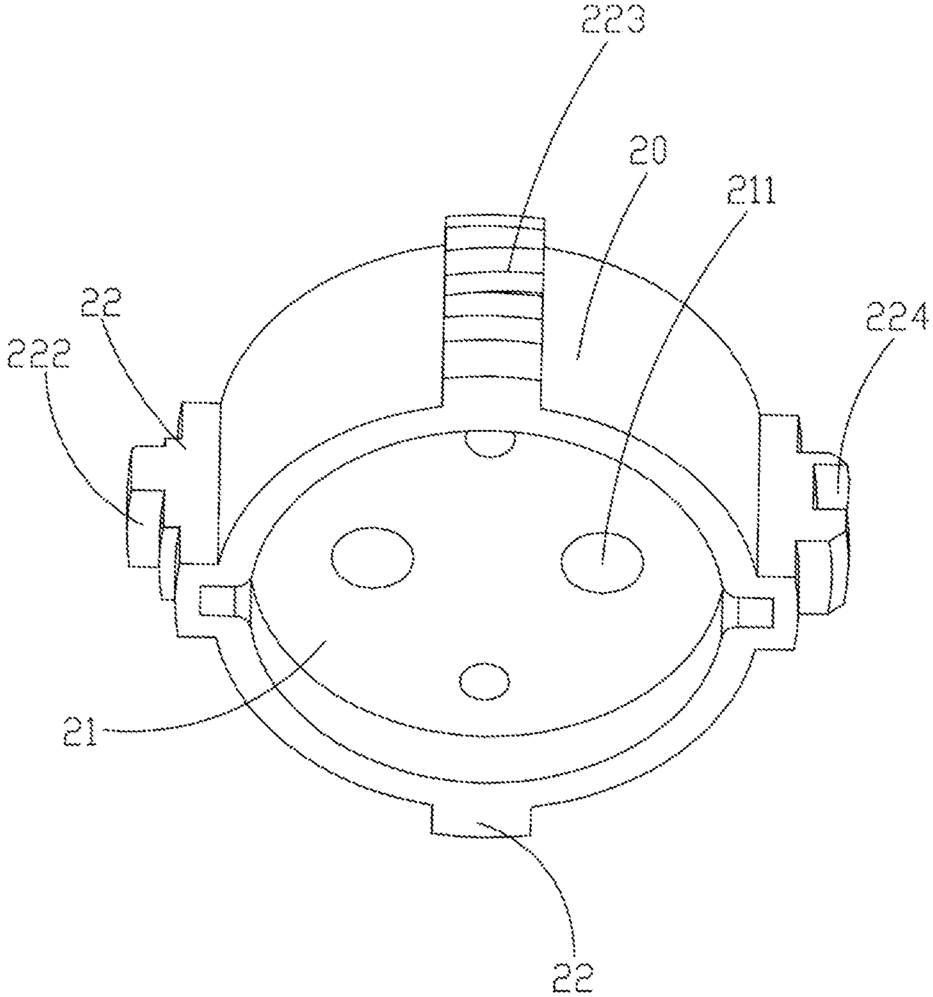
FIG. 8 is a schematic view of the sliding element of the spotlight according to an example of the present disclosure.
Figure 9:
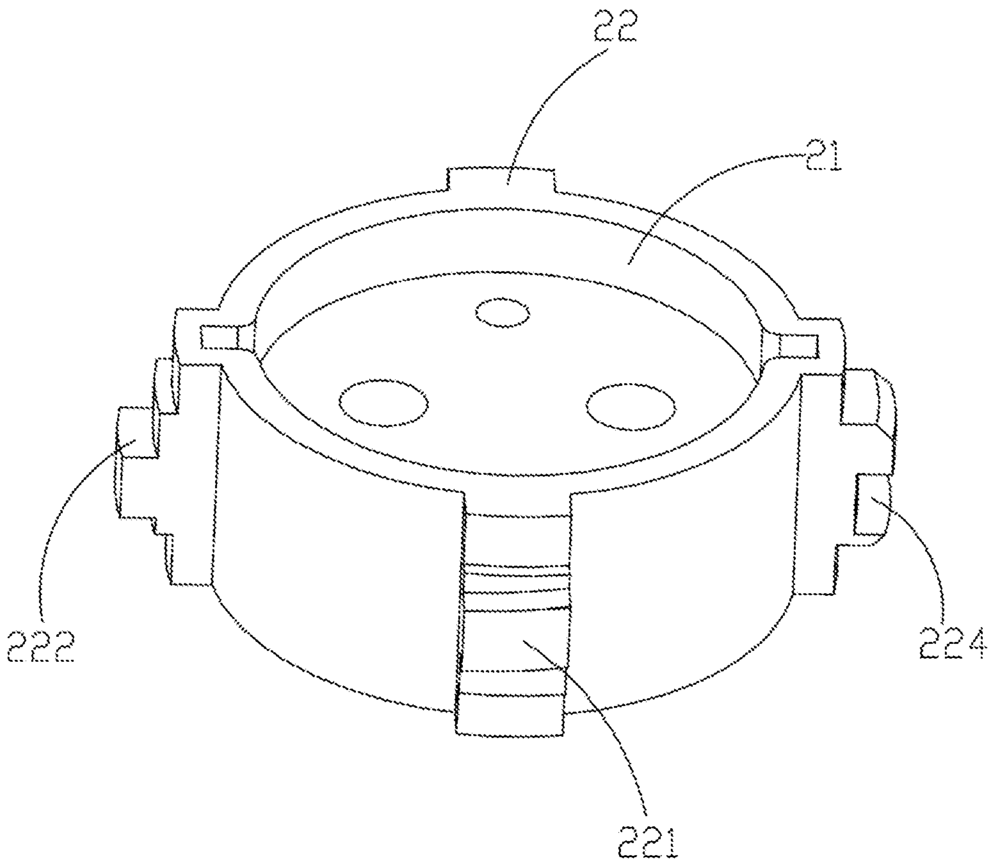
FIG. 9 is a schematic view of another angle of the sliding element of FIG. 8.
Figure 10:
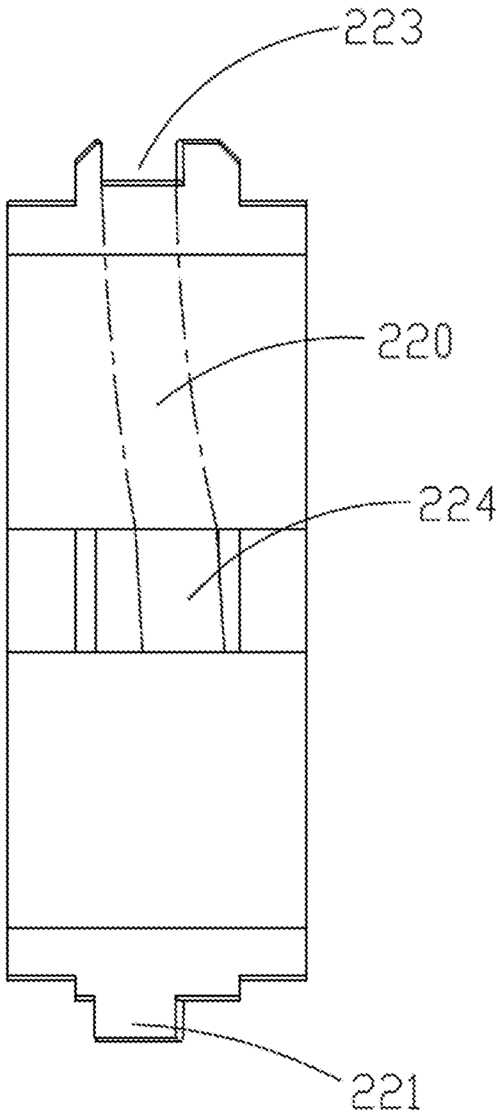
FIG. 10 is a side view of the sliding element of FIG. 8.

As illustrated by FIG. 8 to FIG. 10, the sliding element 2 is a circular block located inside the lamp body 1. The sliding element 2 includes a base 20, a front end of the base 20 is provided with a circular sunk portion 21, a plurality of sliders 22 are protruded from an outer surface of a side wall of the base 20, and the plurality of sliders 22 are arranged in a circumferential direction of the outer surface of the base 20. For example, the sunk portion 21 is used to receive the light emitting assembly 3, a bottom surface of the sunk portion 21 is provided with a plurality of first through holes 211 penetrating the base 20, and a side wall of the sunk portion 21 is provided with a plurality of grooves 212. The sliders 22 are strip-shaped, the sliders 22 are located in the sliding grooves 11 and can move back and forth in the axial direction within the sliding grooves 11. For example, the sliders 22 can slide forward from a first position shown in FIG. 4 to a second position shown in FIG. 5. In the present example, the number of the sliders 22 is set to four.

Each of the sliders 22 is provided with a thread segment, that is, in the present example, four thread segments are provided, including a first thread segment 221, a second thread segment 222, a third thread segment 223 and a fourth thread segment 224 spaced along a circumferential direction of the lamp body 1. For example, structures of the thread segments are different, positions of the first thread segment, the second thread segment, the third thread segment and the fourth thread segment are sequentially advanced or retreated in the axial direction to form a round of external thread 220, so that the sliding element 2 and the rotation adjustment ring 7 are coupled to each other by thread.

A thread form of the thread is trapezoidal or rectangular. In the present example, the stroke of the sliding element 2 is set to 8 mm. Upon the pitch of the thread being 4 mm, the rotation adjustment ring 7 rotates clockwise one round, the sliding element 2 completes the set 8 mm stroke, and slides from the last end to the front end; upon the pitch of the thread being 2 mm, the rotation adjustment ring 7 rotates clockwise two rounds, the sliding element 2 completes the set 8 mm stroke, and slides from the last end to the front end.

As illustrated by FIG. 6, FIG. 7 and FIG. 10, the light emitting assembly 3 is received in the sunk portion 21, and includes a substrate 31 and a luminous unit 32 on one side of the substrate 31. The substrate 31 is provided with a plurality of second through holes 311 penetrating the substrate 31. The spotlight 100 in the present example further includes screws 33, the screws 33 pass through the second through holes 311 and the first through holes 211 to connect the light emitting assembly 3 and the sliding element 2 and make them linked with each other.

The second lens 6 can be linked with the sliding element 2. In the present example, the second lens 6 has a dome shape, and a plurality of bumps 410 are disposed near the lower end of the outer surface of the second lens 6. The bumps 410 are received in the grooves 212 to fix the second lens 6 on the sliding element 2.

As illustrated by FIG. 3 and FIG. 11, the rotation adjustment ring 7 is cylindrical and connected between the front cover 8 and the lamp body 1. For example, the rotation adjustment ring 7 is sleeved on the outer side of the lamp body 1 and a front end of the rotation adjustment ring 7 is inserted into the front cover 8. The inner wall of the rotation adjustment ring 7 is provided with a plurality of rounds of internal thread 710, and the outer wall is provided with a rotation portion 72. The internal thread 710 and the external thread 220 are coupled to each other. Upon the rotation adjustment ring 7 being driven to rotate clockwise by manually rotating the rotation portion 72, the slider 22 is pushed forward, so that the distance between the light emitting assembly 3 and the first lens 4 is shortened. On the contrary, upon the rotation adjustment ring 7 is driven to rotate counterclockwise, the slider 22 is pushed rearward, so that the distance between the light emitting assembly 3 and the first lens 4 is extended. The rotation portion 72 includes a plurality of vertical anti-slip grooves 721, which have the effect of preventing slipping upon the rotation adjustment ring is manually rotated.

Figure 2:
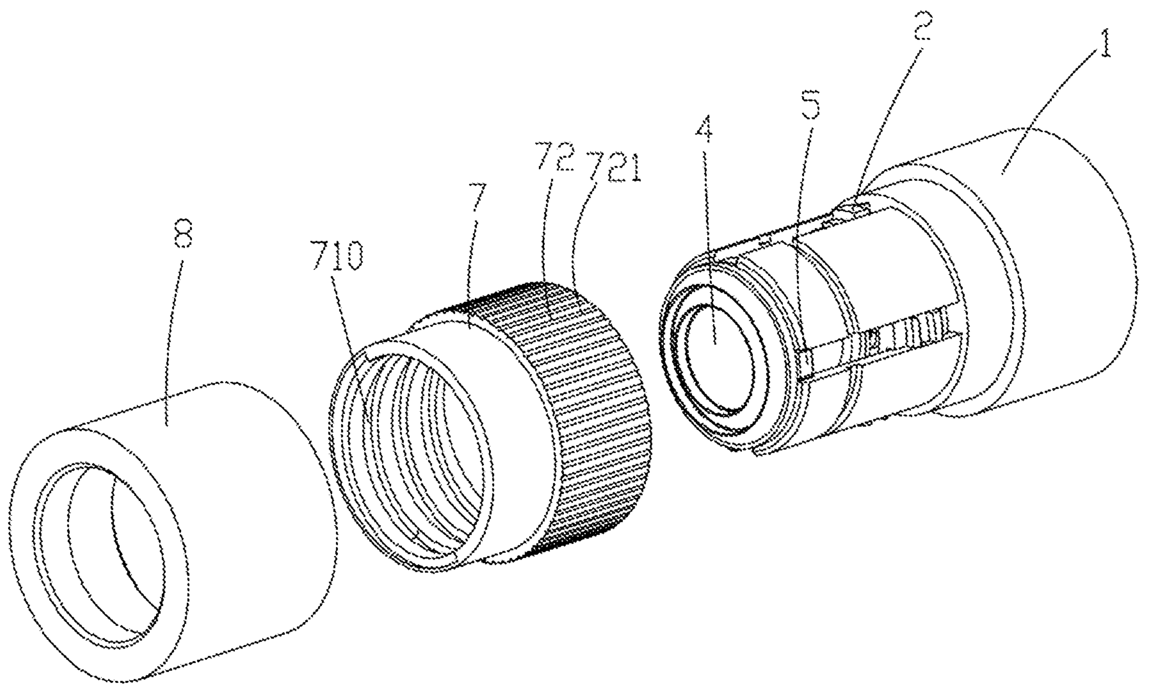
FIG. 2 is an exploded view of the spotlight of FIG. 1 according to an example of the present disclosure.

As illustrated by FIG. 2 and FIG. 11, the front cover 8 is cylindrical and made of a metal material. The inner wall of the front cover 8 is formed with a step 81 to form an annular positioning surface 811. The front cover 8 is sleeved on the outside of the front end of the rotation adjustment ring 7. For example, the inner wall of the front cover 8 is fitted to the outer wall of the rotation adjustment ring 7, and the rotation adjustment ring 7 can rotate along the inner wall of the front cover 8.

As illustrated by FIG. 2 and FIG. 11, the first lens 4 abuts between the supporting member 5 and the front cover 8 and is fixed. In the present example, the first lens 4 is circular. For example, the second lens 6 abuts between the front end surface 520 of the supporting member 5 and the positioning surface 811 of the front cover 8. The second lens 6 is stationary relative to the lamp body 1. By adjusting the distance between the first lens 4 and the second lens 6, the beam angle of the light finally emitted by the second lens 6 can be adjusted to obtain a uniform spot. In addition, the luminous unit 32 is light-distributed by using two lenses, and has high luminous efficiency. In the present example, the sliding element 2 drives the second lens 6 to slide from the last end to the front end, and the beam angle of the spotlight 100 can be increased from 10° to 36°. In other alternative examples, the adjustment range of the beam angle can also be between 8° and 40°.

The spotlight of the present disclosure pushes the sliding element 2 to slide in the axial direction within the lamp body 1 through the rotation adjustment ring 7, and the sliding distance of the sliding element 2 does not exceed the length of the lamp body 1, so that the spotlight 100 has a stationary shape and is stable in positioning. In the thread transmission structure in the spotlight 100, the rotation adjustment ring 7 and the sliding element 2 are coupled to each other by thread, and the thread form of the thread is trapezoidal or rectangular, so that the transmission efficiency is high, that is, upon the rotation adjustment ring 7 being rotated one round, the sliding element has a long straight stroke.

The present disclosure provides a thread transmission structure with high transmission efficiency, an optical system using the transmission structure and a spotlight with a stationary shape.

In one aspect, the present disclosure provides a thread transmission structure, including a sliding element and a rotation adjustment ring sleeved on an outer ring of the sliding element, the rotation adjustment ring being sleeved on an outer side of the sliding element and coupled to the sliding element by thread, the rotation adjustment ring comprising an internal thread, the sliding element comprising an external thread, the sliding element including a plurality of thread segments spaced along a circumferential direction, the plurality of thread segments forming at least one round of interrupted external thread, a thread form of the internal thread and the external thread being trapezoidal or rectangular, and the rotation adjustment ring being rotatable relative to the sliding element to push the sliding element to slide in an axial direction.

Further, a stroke of the sliding element is 2-4 times a pitch of the internal thread or the external thread.

Further, the pitch of the internal thread or the external thread is 4 mm, upon the rotation adjustment ring being rotated one round, the stroke of the sliding element is 8 mm.

Further, the pitch of the internal thread or the external thread is 2 mm, upon the rotation adjustment ring being rotated one round, the stroke of the sliding element is 8 mm.

Further, the thread transmission structure further includes a sliding groove structure, the sliding element slides within the sliding groove structure, and the plurality of thread segments extend from an inner side of the sliding groove structure out of an outer side of the sliding groove structure and are coupled to the rotation adjustment ring by thread.

Further, positions of the plurality of thread segments are sequentially advanced or retreated in the axial direction.

Further, an outer wall surface of the rotation adjustment ring is provided with a rotation portion.

In another aspect, the present disclosure further provides an optical system using the thread transmission structure, the optical system includes a light emitting assembly fixed at a front end of the sliding element, a first lens covering the light emitting assembly and a second lens keeping at a certain distance from the first lens and being fixed, and a beam angle of the optical system can be adjusted by pushing the sliding element to slide in the axial direction by the rotation adjustment ring.

Further, an adjustment range of the beam angle of the light emitting assembly by the first lens and the second lens ranges from 8° to 40°.

In another aspect, the present disclosure further provides a spotlight, including a lamp body, a sliding element being in the lamp body and slidable along an axial direction of the lamp body, a light emitting assembly fixed at a front end of the sliding element and linked with the sliding element, a first lens at a front end of the lamp body and a rotation adjustment ring sleeved on an outer ring of the lamp body, the rotation adjustment ring being coupled to the sliding element by thread, the rotation adjustment ring being rotatable relative to the sliding element and driving the sliding element to slide in the lamp body in the axial direction, to adjust a distance between the light emitting assembly and the first lens.

Further, the lamp body is cylindrical, and includes a side wall and a plurality of sliding grooves extending in the axial direction on the side wall, the plurality of sliding grooves penetrating the side wall, and the sliding element slides in the plurality of sliding grooves.

Further, the focal length adjustment structure further includes a supporting member connected to the front end of the lamp body, the supporting member comprises a plurality of supporting blocks snapped into the sliding grooves.

Further, the sliding element includes a plurality of sliders arranged annularly, the plurality of sliders being located in the sliding grooves and movable within the plurality of sliding grooves.

Further, each of the plurality of sliders is provided with a thread segment, and the thread segment forms at least one round of interrupted external thread.

Further, an inner wall surface of the rotation adjustment ring is provided with an internal thread, and the external thread and the internal thread are coupled to each other.

Further, a thread form of the internal thread and the external thread is trapezoidal.

Further, an outer wall surface of the rotation adjustment ring is provided with a rotation portion.

Further, the spotlight further includes a sliding lens fixed to the front end of the sliding element and covering the light emitting assembly, and a front cover connected to the lamp body.

Further, the first lens abuts between the front cover and the lamp body.

Further, the front cover is cylindrical, and the front cover is sleeved on an outer side of the rotation adjustment ring.

Compared with other implementations, in the thread transmission structure provided by the present disclosure, the rotation adjustment ring and the sliding element are coupled to each other by thread, and the thread form is trapezoidal or rectangular, so that the transmission efficiency is high, that is, upon the rotation adjustment ring being rotated one round, the sliding element has a long straight stroke. The spotlight provided by the present disclosure pushes the sliding element to slide in the axial direction within the lamp body through the rotation adjustment ring, and the sliding distance of the sliding element does not exceed the length of the lamp body, so that the spotlight has a stationary shape and is stable in positioning.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above examples are intended to further illustrate the objects, the technical solutions and the beneficial effects of the present disclosure. It is to be understood that the foregoing description is only examples of the present disclosure and is not intended to limit the invention. Any modifications, equivalents, improvements, etc., made within the spirit and scope of the invention is intended to be included within the scope of the invention.

What is claimed is:

1. A thread transmission structure, comprising a sliding element and a rotation adjustment ring sleeved on an outer ring of the sliding element, wherein:

the rotation adjustment ring is sleeved on an outer side of the sliding element and is coupled to the sliding element by thread, the rotation adjustment ring comprises an internal thread and the sliding element comprises an external thread, the sliding element comprises a plurality of thread segments spaced along a circumferential direction, and the plurality of thread segments form at least one round of interrupted external thread, a thread form of the internal thread and the external thread are trapezoidal or rectangular, the rotation adjustment ring is rotatable relative to the sliding element to push the sliding element to slide in the axial direction, and an outer wall surface of the rotation adjustment ring is provided with a rotation portion, and the rotation portion comprises a plurality of vertical anti-slip grooves configured to prevent slipping upon manually rotating the rotation adjustment ring;

wherein the lamp body is cylindrical, and the lamp body comprises a side wall and a plurality of sliding grooves extending in the axial direction on the side wall wherein the plurality of sliding grooves penetrate the side wall, and the sliding element slides in the plurality of sliding grooves;

wherein a focal length adjustment structure exists and the focal length adjustment structure comprises a supporting member connected to the front end of the lamp body, and the supporting member comprises a plurality of supporting blocks snapped into the sliding grooves.

2. The thread transmission structure according to claim 1, wherein a stroke of the sliding element is 2-4 times of a pitch of the internal thread or the external thread.

3. The thread transmission structure according to claim 2, wherein the pitch of the internal thread or the external thread is 4 mm, and upon the rotation adjustment ring being rotated one round, the stroke of the sliding element is 8 mm.

4. The thread transmission structure according to claim 2, wherein the pitch of the internal thread or the external thread is 2 mm, and upon the rotation adjustment ring being rotated one round, the stroke of the sliding element is 8 mm.

5. The thread transmission structure according to claim 1, wherein the thread transmission structure further comprises a sliding groove structure wherein the sliding element slides within the sliding groove structure, and the plurality of thread segments extend from an inner side of the sliding groove structure out of an outer side of the sliding groove structure and are coupled to the rotation adjustment ring by thread.

6. The thread transmission structure according to claim 1, wherein positions of the plurality of thread segments are sequentially advanced or retreated in an axial direction.

7. The thread transmission structure according to claim 1, wherein an optical system using the thread transmission structure exists, wherein the optical system comprises a light emitting assembly fixed at a front end of the sliding element, a first lens covering the light emitting assembly and a second lens that keeps a certain distance from the first lens and is fixed, and a beam angle of the optical system can be adjusted by pushing the sliding element to slide in the axial direction by the rotation adjustment ring.

8. The thread transmission structure according to claim 7, wherein an adjustment range of the beam angle of the light emitting assembly by the first lens and the second lens ranges from 8° to 40°.

9. A spotlight, comprising:

a lamp body, a sliding element being in the lamp body and slidable along an axial direction of the lamp body, a light emitting assembly fixed at a front end of the sliding element and linked with the sliding element, a first lens located at a front end of the lamp body and a rotation adjustment ring sleeved on an outer ring of the lamp body, wherein the rotation adjustment ring is coupled to the sliding element by thread, and is rotatable relative to the sliding element and drives the sliding element to slide in the lamp body in the axial direction, and to adjust a distance between the light emitting assembly and the first lens, and wherein an outer wall surface of the rotation adjustment ring is provided with a rotation portion, and the rotation portion comprises a plurality of vertical anti-slip grooves configured to prevent slipping upon manually rotating the rotation adjustment ring;

wherein the lamp body is cylindrical, and the lamp body comprises a side wall and a plurality of sliding grooves extending in the axial direction on the side wall wherein the plurality of sliding grooves penetrate the side wall, and the sliding element slides in the plurality of sliding grooves;

wherein a focal length adjustment structure exists and the focal length adjustment structure comprises a supporting member connected to the front end of the lamp body, and the supporting member comprises a plurality of supporting blocks snapped into the sliding grooves.

10. The spotlight according to claim 9, wherein the sliding element comprises a plurality of sliders arranged annularly, and the plurality of sliders are located in the plurality of sliding grooves and are movable within the plurality of sliding grooves.

11. The spotlight according to claim 10, wherein each of the plurality of sliders is provided with a thread segment, and the thread segment forms at least one round of interrupted external thread.

12. The spotlight according to claim 11, wherein an inner wall surface of the rotation adjustment ring is provided with an internal thread, and the external thread and the internal thread are coupled to each other.

13. The spotlight according to claim 11, wherein a thread form of the internal thread and the external thread is trapezoidal.

14. The spotlight according to claim 9, wherein the spotlight further comprises a sliding lens fixed to the front end of the sliding element that covers the light emitting assembly, and a front cover connected to the lamp body.

15. The spotlight according to claim 14, wherein the first lens abuts between the front cover and the lamp body.

16. The spotlight according to claim 14, wherein the front cover is cylindrical, and the front cover is sleeved on an outer side of the rotation adjustment ring.

* * * * *